United States Patent
Wang et al.

(10) Patent No.: US 11,692,576 B2
(45) Date of Patent: Jul. 4, 2023

(54) SINGLE GROOVE SINGLE-SIDED FASTENER AND INSTALLATION METHOD THEREOF

(71) Applicant: MEISHAN CRRC FASTENING SYSTEM CO., LTD, Meishan (CN)

(72) Inventors: Shibo Wang, Meishan (CN); Yu Liu, Meishan (CN); Tao Deng, Meishan (CN); Yunlong Jia, Meishan (CN); Xiangyun Zhao, Meishan (CN); Chuanqi Li, Meishan (CN); Xu He, Meishan (CN); Wei Li, Meishan (CN); Long Guo, Meishan (CN)

(73) Assignee: MEISHAN CRRC FASTENING SYSTEM CO., LTD, Sichuan (CN)

( * ) Notice: Subject to any disclaimer, the term of this patent is extended or adjusted under 35 U.S.C. 154(b) by 500 days.

(21) Appl. No.: 16/975,132

(22) PCT Filed: May 26, 2020

(86) PCT No.: PCT/CN2020/092249
§ 371 (c)(1),
(2) Date: Aug. 23, 2020

(87) PCT Pub. No.: WO2021/208187
PCT Pub. Date: Oct. 21, 2021

(65) Prior Publication Data
US 2023/0119925 A1    Apr. 20, 2023

(30) Foreign Application Priority Data
Apr. 14, 2020   (CN) .................. 202010291976.4

(51) Int. Cl.
*F16B 19/10*   (2006.01)
*B21J 15/04*   (2006.01)

(52) U.S. Cl.
CPC ......... *F16B 19/1054* (2013.01); *B21J 15/043* (2013.01)

(58) Field of Classification Search
CPC .......................... B21J 15/043; F16B 19/1054
See application file for complete search history.

(56) References Cited

U.S. PATENT DOCUMENTS

| 10,738,816 | B2 * | 8/2020 | Yan | ........................ B21J 15/022 |
| 2016/0325340 | A1 * | 11/2016 | Liu | ........................ B21J 15/043 |
| 2019/0003506 | A1 * | 1/2019 | Yan | ........................ B21J 15/022 |

FOREIGN PATENT DOCUMENTS

CN   212055430 U   * 12/2020  .............. B21J 15/02

* cited by examiner

*Primary Examiner* — Bayan Salone
(74) *Attorney, Agent, or Firm* — Houtteman Law LLC

(57) ABSTRACT

A single groove single-sided fastener comprises: a rivet consisting of a rivet head, a polish rod, a locking groove, a tail pulling groove and a tail tooth in sequence, and a lantern ring consisting of a sleeve and a dead head; a tail of the rivet is of a single groove short-tail structure, a ratio of a length of the tail pulling groove to a total length of the tail tooth is 0.1~1.5, an included angle between a bottom generatrix of the tail pulling groove and an axis of the rivet is −30°~0°, two axial ends of the bottom of the tail pulling groove and the tail of the tail tooth are of a fillet transition structure, a ratio of a length of a straight part of the tail tooth to the total length of the tail tooth is 0.1~1.

12 Claims, 1 Drawing Sheet

SINGLE GROOVE SINGLE-SIDED FASTENER AND INSTALLATION METHOD THEREOF

TECHNICAL FIELD

The invention belongs to the technical field of riveting, and in particular to the design and manufacture of a single groove single-sided pulling rivet riveting fastener for blind hole connection, which belongs to the riveting category (B21J) and the fastener category (F16B) for metal machining.

BACKGROUND ART

When a double-sided riveted pulling rivet is installed, the rivet is inserted into the installation hole from a front side of the connected piece, and then, a lantern ring is sleeved onto the periphery of the rivet from a rear side, where the head of the lantern ring is arranged at the front, and the lantern ring cylinder is arranged at the rear; the riveting device arranged on the rear sides of the two connected pieces clamps the rivet tail pulling groove section for pull riveting. After riveting is completed, the lantern ring cylinder is deformed and then radially pressed on the periphery of the ring groove section of the rivet, and the head of the lantern ring is axially pressed on the surface of the rear connected piece, whereby the two connected pieces are fastened. However, the premise of double-sided riveting is that enough space is required on both sides of an object to be riveted. In practical work, especially in the assembly process, there is often only enough space on one side of the object, while the space on the other side is very limited, and even bolts cannot be placed in, for example, fastener coupling of blind holes. Therefore, a single-sided deformation connection pulling rivet is often employed.

The rivet rod and the lantern ring are assembled before the use of a conventional single-sided deformation connection pulling rivet, and after the assembly, it only requires, when installed, to insert it from one side of the connected piece into the installation hole, and then the tail of the single-sided connection product is seized by the claws in the riveting device, which in turn drive the rivet to move outwards and extrude the lantern ring, causing the lantern ring tube part to bulge and deform to form an annular convex blind rivet head, and the lantern ring is further extruded by the sleeve to deform plastically, clamping the riveted piece and snapping the outer rivet rod, to thereby finish the riveting.

For single-sided riveting, due to the fact that blind holes or structures which are not easy to enter are subjected to the single-sided riveting, requirements on the performance of the lantern ring vary, and besides, higher requirements are set forth for the performance of the rivet structure.

In the prior art, a bolt, a single groove short-tail ring groove rivet and a snap-type single-sided ring groove rivet are generally used for fastening and coupling a clamped piece.

When a single groove short-tail ring groove rivet is adopted for fastening connection, it needs to pre-install the two sides of the clamped piece, where a blind hole operation is not suitable, and sometimes, a processing hole needs to be formed on the clamped piece, which will do damage to the clamped piece; when a snap-type single-sided ring groove rivet is used for fastening and coupling a blind-hole type clamped piece, the rivet is subjected to comparatively large plastic deformation in the process of snapping the rivet, which may damage the clamped piece, and even loosen the already fully deformed riveting joint.

SUMMARY OF THE INVENTION

The present invention addresses the deficiencies of the prior art by disclosing a single groove single-sided fastener and a method of installing the same. It is an object of the present invention to provide a single groove single-sided fastening connection system with better performance and without the need for snapping.

The present invention is achieved by the following technical solution:

A single groove single-sided fastener comprises a rivet and a lantern ring and is characterized in that: the rivet consists of a rivet head, a polish rod, a locking groove, a tail pulling groove and a tail tooth in sequence, and the lantern ring consists of a sleeve and a dead head.

The tail of the rivet is of a single groove short-tail structure, a ratio of a length of the tail pulling groove to a total length of the tail tooth is 0.1~2, an included angle A between a bottom generatrix of the tail pulling groove and an axis of the rivet is $-30°\sim0°$, two axial ends of a bottom of the tail pulling groove are of a fillet transition structure, a ratio of a length of a straight part of the tail tooth to the total length of the tail tooth is 0.1~1, and the tail of the tail tooth is of a fillet transition structure.

Further, the ratio of the length of the tail pulling groove to the total length of the tail tooth is 0.5~1.5.

Further, the included angle A between the bottom generatrix of the tail pulling groove and the axis of the rivet is $-15°\sim0°$.

Further, a circular arc of the fillet transition structures at the two axial ends of the bottom of the tail pulling groove is as follows: $(1/125) \leq (R1/D) \leq (1/4)$, $(1/125) \leq (R2/D) \leq (1/4)$, wherein D is a radial minimum diameter of the tail pulling groove, R1 is a radius of the transition fillet between the tail pulling groove and the locking groove, and R2 is a radius of the transition fillet between the tail pulling groove and the tail tooth.

Further, the length of the straight part of the tail tooth is 0.2~0.8 of the total length of the tail tooth.

Further, a circular arc of the tail fillet transition structure of the tail tooth is as follows: $(1/125) \leq (R3/D1) \leq (1/2)$, where D1 is the tail tooth diameter and R3 is the radius of the tail fillet of the tail tooth.

Compared with the Prior Art:

The fastener structure researched and innovatively designed by the present invention improves the length relationship of the straight part of the tail tooth, and the transition between the oblique angle and the fillet as designed on the tail tooth increases the contact area between the tail tooth and the claws of the installation tool and improves the stress direction; the rivet tail tooth of the fastener of the present invention can meet the needs of riveting load, prevent stress concentration during the installation process, enable the grabbing connection to be more stable and reliable, and can further protect the rivet and the riveting tool and prolong their service lives.

When fastening and coupling clamped pieces such as blind holes in the present invention, due to the design of the rivet ring groove and the tail tooth structure, the riveting tool is more stable and reliable when grabbing the rivet for riveting, and can meet the riveting requirement by implementing a relatively low riveting tension, which can miniaturize and lighten the riveting tool, effectively avoid the obvious deformation of the clamped piece and the rivet in the installation process, protect the clamped piece and the rivet, prolong the service life of the installation tool while meeting the requirements of use, enable the riveting combination to be more stable, further protect the original structural performance of the coupled clamped piece, and generates no installation noise; during the installation process, this can also prevent the rivet tail, when snapped, from flying out and causing injury to the installation personnel, thus reducing potential safety hazards; after the installation is finished, the anti-corrosion treatment does not need to be carried out again; and further, in the production process, this can help to save raw materials and shorten the production cycle.

Figure 1:
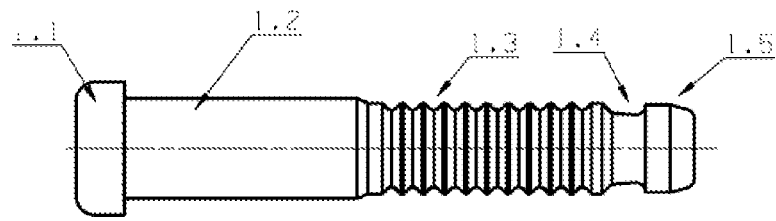
FIG. 1 is a schematic view of a rivet structure of the fastener of the present invention.
Figure 2:
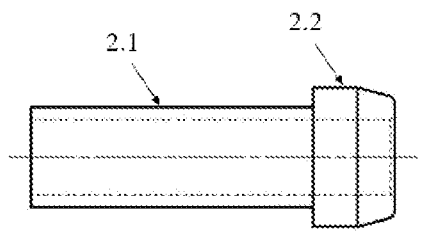
FIG. 2 is a schematic view of a lantern ring structure of the fastener of the present invention.
Figure 3:
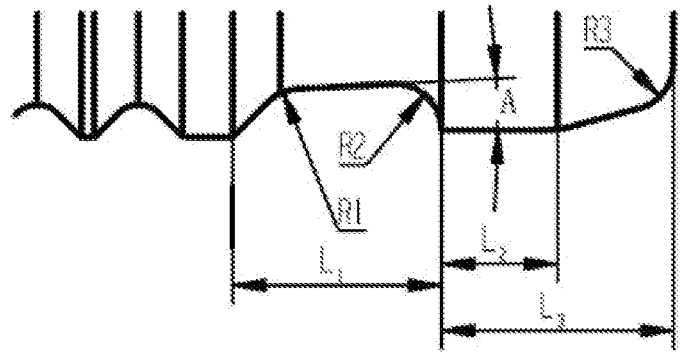
FIG. 3 is a partially enlarged schematic view of the rivet structure of the present invention.

In the drawing, 1.1 is a head, 1.2 is a polish rod, 1.3 is a locking groove, 1.4 is a tail pulling groove, 1.5 is a tail tooth, 2.1 is a sleeve, 2.2 is a dead head, $L_1$ is the length of the tail pulling groove, $L_2$ is the length of the straight part of the tail tooth, $L_3$ is the total length of the tail tooth, D is the radial minimum diameter of the tail pulling groove, $D_1$ is the diameter of the tail tooth, R1 is the radius of the transition fillet between the tail pulling groove and the locking groove, R2 is the radius of the transition fillet between the tail pulling groove and the tail tooth, R3 is the radius of the tail tooth tail fillet, and A is the included angle between the tail pulling groove bottom generatrix and the rivet axis.

DETAILED DESCRIPTION OF THE INVENTION

The invention will now be further described with reference to specific embodiments which are further illustrative of the principles of the invention and are not intended to limit the invention in any way, and the same or similar techniques as or to the invention do not exceed the scope of the invention.

In Connection with the Drawings

A single groove single-sided fastener comprises a rivet and a lantern ring, wherein the rivet consists of a rivet head 1.1, a polish rod 1.2, locking grooves 1.3, a tail pulling groove 1.4 and a tail tooth 1.5 in sequence, and the lantern ring consists of a sleeve 2.1 and a dead head 2.2.

The rivet tail is of a single groove short-tail structure, a ratio of the length $L_1$ of the tail pulling groove to the total length $L_3$ of the tail tooth is 0.1~1.5, an included angle A between the bottom generatrix of the tail pulling groove 1.4 and the axis of the rivet is −30°~0°, the two axial ends of the bottom of the tail pulling groove 1.4 are of a fillet transition structure, a ratio of the length L2 of the straight part of the tail tooth to the total length L3 of the tail tooth is 0.1~1, and the tail of the tail tooth is of a fillet transition structure.

The ratio of the length $L_1$ of the tail pulling groove to the total length $L_3$ of the tail tooth is 0.5~1.

The included angle A between the bottom generatrix of the tail pulling groove and the axis of the rivet is −15°~0°. When the included angle A between the bottom generatrix of the tail pulling groove and the rivet axis is within this range, the diameter of the coupling end of the tail pulling groove 1.4 and the tail tooth 1.5 is smaller than the diameter of the coupling end of the tail pulling groove 1.4 and the locking groove 1.3.

The ratio of the length $L_2$ of the straight part of the tail tooth to the total length $L_3$ of the tail tooth is 0.2~0.8.

The circular arcs of the fillet transition structures at the two axial ends of the bottom of the tail pulling groove are as follows: $(1/125) \le (R1/D) \le (1/4)$, $(1/125) \le (R2/D) \le (1/4)$, wherein D is the radial minimum diameter of the tail pulling groove, R1 is the radius of the transition fillet between the tail pulling groove and the locking groove, and R2 is the radius of the transition fillet between the tail pulling groove and the tail tooth. The circular arc of the tail fillet transition structure of the tail tooth is as follows: $(1/125) \le (R3/D_1) \le (1/2)$, where $D_1$ is the tail tooth diameter and R3 is the radius of the tail fillet of the tail tooth.

Figures 4, 5, 6, 7:
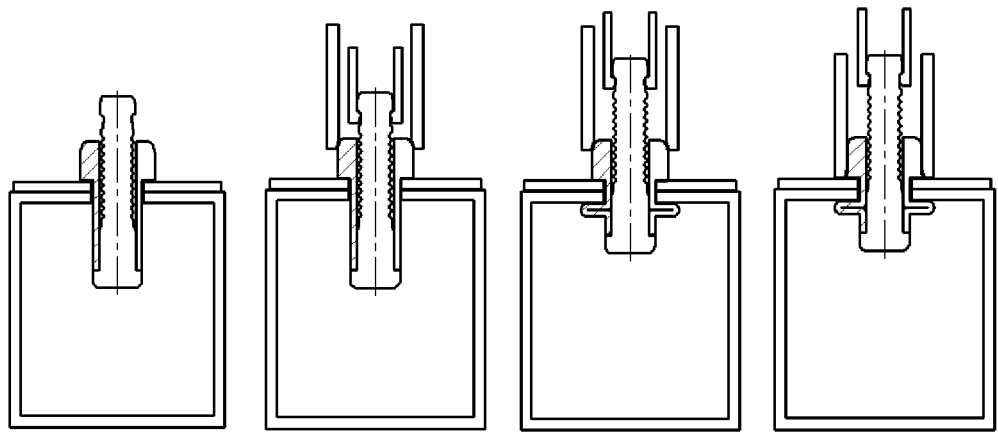
FIG. 4 is a schematic view showing a fastening connection preparation state of the present invention.
FIG. 5 is a schematic view showing a preparation state in which the fastener is riveted with a riveting tool of the present invention.
FIG. 6 is a schematic view of the riveting process I of the fastening connection of the present invention.
FIG. 7 is a schematic view of the riveting state II of the fastening connection of the present invention.

The riveting process of the fastener of the present invention is illustrated in FIGS. 4-7. The specific installation process is as follows:

(1) As shown in FIG. 4, a rivet and a lantern ring are made penetrate through a clamped piece in a manner as shown in the drawings to prepare for riveting.

(2) As shown in FIG. 5, a special riveting tool is used, and the tail tooth 1.5 of the rivet is extended into the riveting tool, such that the tail pulling groove 1.4 and the tail tooth 1.5 are engaged with claws in the riveting tool.

(3) As shown in FIG. 6, a riveting tool switch is activated to cause the claws in the riveting tool to drag the tail tooth 1.5 to move relative to an anvil, so as to apply an axial force to the rivet, while the anvil slightly squeezes the dead head 2.2 of the lantern ring.

(4) As shown in FIG. 7, under an action of the axial force, the lantern ring sleeve 2.1 starts to deform outside the clamped piece, and the anvil continues to squeeze the dead head 2.2 part of the lantern ring; after the lantern ring is completely deformed on both sides of the clamped piece, the anvil starts to move in the opposite direction, and after the two are completely separated, the riveting process is completed.

The invention claimed is:

1. A single groove single-sided fastener comprising a rivet and a lantern ring, wherein the rivet consists of a rivet head, a polish rod, a locking groove, a tail pulling groove and a tail tooth in sequence, and the lantern ring consists of a sleeve and a dead head;

the tail of the rivet is of a single groove short-tail structure, a ratio of a length of the tail pulling groove to a total length of the tail tooth is 0.1~2, an included angle A between a bottom generatrix of the tail pulling groove and an axis of the rivet is −30°~0°, two axial ends of a bottom of the tail pulling groove are of a fillet transition structure, a ratio of a length of a straight part of the tail tooth to the total length of the tail tooth is 0.1~1, and a tail of the tail tooth is of a fillet transition structure.

2. The single groove single-sided fastener according to claim 1, wherein the ratio of the length of the tail pulling groove to the total length of the tail tooth is 0.5~1.5.

3. The single groove single-sided fastener according to claim 2, wherein the included angle A between the bottom generatrix of the tail pulling groove and the axis of the rivet is −15°~0°.

4. The single groove single-sided fastener according to claim 2, wherein the length of the straight part of the tail tooth is 0.2~0.8 of the total length of the tail tooth.

5. The single groove single-sided fastener according to claim 2, wherein a circular arc of the fillet transition structures at the two axial ends of the bottom of the tail pulling groove is as follows: $(1/125) \leq (R1/D) \leq (1/4)$, $(1/125) \leq (R2/D) \leq (1/4)$, wherein D is a radial minimum diameter of the ring groove, R1 is a radius of the transition fillet between the tail pulling groove and the locking groove, and R2 is a radius of the transition fillet between the tail pulling groove and the tail tooth.

6. The single groove single-sided fastener according to claim 2, wherein a circular arc of the tail fillet transition structure of the tail tooth is as follows: $(1/125) \leq (R3/D_1) \leq (1/2)$, where $D_1$ is a tail tooth diameter and R3 is a radius of the tail fillet of the tail tooth.

7. A single groove single-sided fastener installation method, wherein the fastener is a single groove single-sided fastener according to claim 1, comprising the steps of:
(1) making a rivet and a lantern ring penetrate through a clamped piece in a manner as shown in the drawings to prepare for riveting;
(2) extending the tail tooth of the rivet into a riveting tool with the riveting tool, such that the tail pulling groove and the tail tooth are engaged with claws in the riveting tool;
(3) activating a riveting tool switch to cause the claws in the riveting tool to drag the tail tooth to move relative to an anvil, so as to apply an axial force to the rivet, while the anvil slightly squeezing the dead head of the lantern ring;
(4) under an action of the axial force, the lantern ring sleeve starting to deform outside the clamped piece, and the anvil continuing to squeeze the dead head part of the lantern ring, wherein after the lantern ring is completely deformed on both sides of the clamped piece, the anvil starts to move in the opposite direction, and after the two are completely separated, the riveting process is completed.

8. A single groove single-sided fastener installation method, wherein the fastener is a single groove single-sided fastener according to claim 2, comprising the steps of:
(1) making a rivet and a lantern ring penetrate through a clamped piece in a manner as shown in the drawings to prepare for riveting;
(2) extending the tail tooth of the rivet into a riveting tool with the riveting tool, such that the tail pulling groove and the tail tooth are engaged with claws in the riveting tool;
(3) activating a riveting tool switch to cause the claws in the riveting tool to drag the tail tooth to move relative to an anvil, so as to apply an axial force to the rivet, while the anvil slightly squeezing the dead head of the lantern ring;
(4) under an action of the axial force, the lantern ring sleeve starting to deform outside the clamped piece, and the anvil continuing to squeeze the dead head part of the lantern ring, wherein after the lantern ring is completely deformed on both sides of the clamped piece, the anvil starts to move in the opposite direction, and after the two are completely separated, the riveting process is completed.

9. A single groove single-sided fastener installation method, wherein the fastener is a single groove single-sided fastener according to claim 3, comprising the steps of:
(1) making a rivet and a lantern ring penetrate through a clamped piece in a manner as shown in the drawings to prepare for riveting;
(2) extending the tail tooth of the rivet into a riveting tool with the riveting tool, such that the tail pulling groove and the tail tooth are engaged with claws in the riveting tool;
(3) activating a riveting tool switch to cause the claws in the riveting tool to drag the tail tooth to move relative to an anvil, so as to apply an axial force to the rivet, while the anvil slightly squeezing the dead head of the lantern ring;
(4) under an action of the axial force, the lantern ring sleeve starting to deform outside the clamped piece, and the anvil continuing to squeeze the dead head part of the lantern ring, wherein after the lantern ring is completely deformed on both sides of the clamped piece, the anvil starts to move in the opposite direction, and after the two are completely separated, the riveting process is completed.

10. A single groove single-sided fastener installation method, wherein the fastener is a single groove single-sided fastener according to claim 4, comprising the steps of:
(1) making a rivet and a lantern ring penetrate through a clamped piece in a manner as shown in the drawings to prepare for riveting;
(2) extending the tail tooth of the rivet into a riveting tool with the riveting tool, such that the tail pulling groove and the tail tooth are engaged with claws in the riveting tool;
(3) activating a riveting tool switch to cause the claws in the riveting tool to drag the tail tooth to move relative to an anvil, so as to apply an axial force to the rivet, while the anvil slightly squeezing the dead head of the lantern ring;
(4) under an action of the axial force, the lantern ring sleeve starting to deform outside the clamped piece, and the anvil continuing to squeeze the dead head part of the lantern ring, wherein after the lantern ring is completely deformed on both sides of the clamped piece, the anvil starts to move in the opposite direction, and after the two are completely separated, the riveting process is completed.

11. A single groove single-sided fastener installation method, wherein the fastener is a single groove single-sided fastener according to claim 5, comprising the steps of:
(1) making a rivet and a lantern ring penetrate through a clamped piece in a manner as shown in the drawings to prepare for riveting;
(2) extending the tail tooth of the rivet into a riveting tool with the riveting tool, such that the tail pulling groove and the tail tooth are engaged with claws in the riveting tool;
(3) activating a riveting tool switch to cause the claws in the riveting tool to drag the tail tooth to move relative to an anvil, so as to apply an axial force to the rivet, while the anvil slightly squeezing the dead head of the lantern ring;
(4) under an action of the axial force, the lantern ring sleeve starting to deform outside the clamped piece, and the anvil continuing to squeeze the dead head part of the lantern ring, wherein after the lantern ring is completely deformed on both sides of the clamped piece, the anvil starts to move in the opposite direction, and after the two are completely separated, the riveting process is completed.

12. A single groove single-sided fastener installation method, wherein the fastener is a single groove single-sided fastener according to claim 6, comprising the steps of:
   (1) making a rivet and a lantern ring penetrate through a clamped piece in a manner as shown in the drawings to prepare for riveting;
   (2) extending the tail tooth of the rivet into a riveting tool with the riveting tool, such that the tail pulling groove and the tail tooth are engaged with claws in the riveting tool;
   (3) activating a riveting tool switch to cause the claws in the riveting tool to drag the tail tooth to move relative to an anvil, so as to apply an axial force to the rivet, while the anvil slightly squeezing the dead head of the lantern ring;
   (4) under an action of the axial force, the lantern ring sleeve starting to deform outside the clamped piece, and the anvil continuing to squeeze the dead head part of the lantern ring, wherein after the lantern ring is completely deformed on both sides of the clamped piece, the anvil starts to move in the opposite direction, and after the two are completely separated, the riveting process is completed.

* * * * *